(12) United States Patent
Hunt

(10) Patent No.: US 9,740,193 B2
(45) Date of Patent: Aug. 22, 2017

(54) SENSOR-BASED SAFETY FEATURES FOR ROBOTIC EQUIPMENT

(71) Applicant: RoboticVISIONTech, Inc., Silver Spring, MD (US)

(72) Inventor: Shawn Hunt, Pinckney, MI (US)

(73) Assignee: RoboticVISIONTech, Inc., Silver Spring, MD (US)

( * ) Notice: Subject to any disclaimer, the term of this patent is extended or adjusted under 35 U.S.C. 154(b) by 70 days.

(21) Appl. No.: 14/432,732

(22) PCT Filed: Aug. 8, 2014

(86) PCT No.: PCT/US2014/050405
§ 371 (c)(1),
(2) Date: Mar. 31, 2015

(87) PCT Pub. No.: WO2016/022155
PCT Pub. Date: Feb. 11, 2016

(65) Prior Publication Data
US 2016/0224012 A1 Aug. 4, 2016

(51) Int. Cl.
*G05B 19/18* (2006.01)
*G05B 19/4061* (2006.01)
*B25J 9/16* (2006.01)

(52) U.S. Cl.
CPC ........ *G05B 19/4061* (2013.01); *B25J 9/1676* (2013.01); *G05B 2219/39001* (2013.01);
(Continued)

(58) Field of Classification Search
CPC ...... G05B 19/4061; G05B 2219/39001; G05B 2219/39082; G05B 2219/39094; B25J 9/1676
See application file for complete search history.

(56) References Cited

U.S. PATENT DOCUMENTS 4,967,370 A * 10/1990 Stern .................... B25J 9/1692
700/254
7,024,278 B2 * 4/2006 Chiappetta ........... G05D 1/0242
15/319

(Continued)

OTHER PUBLICATIONS

International Search Report and Written Opinion for International Application No. PCT/US2014/050405 mailed Dec. 16, 2014.

*Primary Examiner* — Ian Jen
(74) *Attorney, Agent, or Firm* — Turk IP Law, LLC

(57) ABSTRACT

Technologies are generally described for sensor-based safety features for robotic equipment, and the implementation thereof. One or more sensors may be positioned relative to the robotic equipment such that the sensors may capture light from at least a portion of an environment surrounding the robotic equipment. In some examples, the sensors may be integrated with the robotic equipment and/or may be configured to rotate. An analysis module coupled to the sensors may build a model image of the environment based on the light captured by the sensors. The analysis module may detect that an unintended object is approaching the robotic equipment in response to detecting a change in the model image, and based on a proximity and/or a speed of approach of the object to the robotic equipment, the analysis module may instruct the robotic equipment to reduce an operating speed and/or stop motion of the robotic equipment.

16 Claims, 9 Drawing Sheets

(52) U.S. Cl.
CPC ........... *G05B 2219/39082* (2013.01); *G05B 2219/39094* (2013.01); *G05B 2219/40339* (2013.01)

(56) References Cited

U.S. PATENT DOCUMENTS

| | | | |
|---|---|---|---|
| 2001/0041077 A1* | 11/2001 | Lehner | G01V 8/10 396/661 |
| 2005/0207619 A1* | 9/2005 | Lohmann | G01S 17/026 382/103 |
| 2009/0088634 A1 | 4/2009 | Zhao et al. | |
| 2009/0222134 A1 | 9/2009 | Franke et al. | |
| 2009/0268029 A1* | 10/2009 | Haussmann | F16P 3/142 348/153 |
| 2012/0327190 A1* | 12/2012 | Massanell | B25J 9/1676 348/46 |

\* cited by examiner

SENSOR-BASED SAFETY FEATURES FOR ROBOTIC EQUIPMENT

CROSS-REFERENCE TO RELATED APPLICATION

This Application is the U.S. National Stage filing under 35 U.S.C §371 of International Application No. PCT/US14/50405, filed on Aug. 8, 2014. The disclosure of the International Application is herein incorporated by reference in its entirety.

BACKGROUND

Unless otherwise indicated herein, the materials described in this section are not prior art to the claims in this application and are not admitted to be prior art by inclusion in this section.

In manufacturing environments, for example, robotic equipment may be used to supplement and/or replace human labor to allow a quick, cost effective, and quality controlled manufacturing process. Robotic equipment, along with other machines and/or peripherals performing a task in conjunction with the robotic equipment, are referred to as a work cell, or cell. How the robotic equipment interacts with the other machines in the cell may be programmed, both with regard to a position of the robotic equipment in the cell and a synchronization with the other machines. The operational motions and sequences to be performed by the robotic equipment may be automatically programmed and controlled by one or more computing devices coupled to the robotic equipment. In some examples, the computing devices may be integrated with the robotic equipment.

A variety of safety features for robotic equipment, such as light screens, laser scanners, fencing, and/or safety mats, may be implemented to provide protection to humans working in the manufacturing environment, as well as the robotic equipment itself. However, the cost and complexity of implementing such safety features may be prohibitive in some cases. Accordingly, current safety features and the implementation thereof could use improvements and/or alternative or additional solutions in order to provide and promote a safe, productive manufacturing environment.

SUMMARY

The present disclosure generally describes techniques to implement sensor-based safety features for equipment.

According to some examples, methods to implement sensor-based safety features for robotic equipment are described. Example methods may include generating a model image of an environment surrounding the robotic equipment based on light captured by one or more sensors, where a time variation of the model image is stored as a plurality of frames; detecting a change in the model image based on a comparison of one or more frames; and determining whether an unintended object is approaching the robotic equipment based on the detected change. Example methods may also include instructing the robotic equipment to adjust an operating speed of the robotic equipment based on one or more of a proximity and a speed of approach of the object to the robotic equipment in response to a determination that the unintended object is approaching the robotic equipment.

According to other examples, an apparatus configured to implement sensor-based safety features for robotic equipment is described. An example apparatus may include one or more sensors configured to capture light from an environment surrounding the robotic equipment and at least one analysis module communicatively coupled to the one or more sensors. The at least one analysis module may be configured to generate a model image of an environment surrounding the robotic equipment based on the light captured by the one or more sensors, where a time variation of the model image is stored as a plurality of frames; detect a change in the model image based on a comparison of one or more frames; and determine whether an unintended object is approaching the robotic equipment based on the detected change. The at least one analysis module may also be configured to instruct the robotic equipment to adjust an operating speed of the robotic equipment based on one or more of a proximity and a speed of approach of the object to the robotic equipment in response to a determination that the unintended object is approaching the robotic equipment.

According to further examples, a system to implement sensor-based safety features for robotic equipment is described. The system may include at least one imaging module configured to capture light of an environment surrounding the robotic equipment through one or more sensors; at least one modeling module configured to generate a model image of an environment surrounding the robotic equipment based on the light captured by the at least one imaging module, where a time variation of the model image is stored as a plurality of frames; and at least one detection module configured to detect a change in the model image based on a comparison of one or more frames and determine whether an unintended object is approaching the robotic equipment based on the detected change. The system may also include at least one controller configured to instruct the robotic equipment to adjust an operating speed of the robotic equipment based on one or more of a proximity and a speed of approach of the object to the robotic equipment in response to a determination that the unintended object is approaching the robotic equipment.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
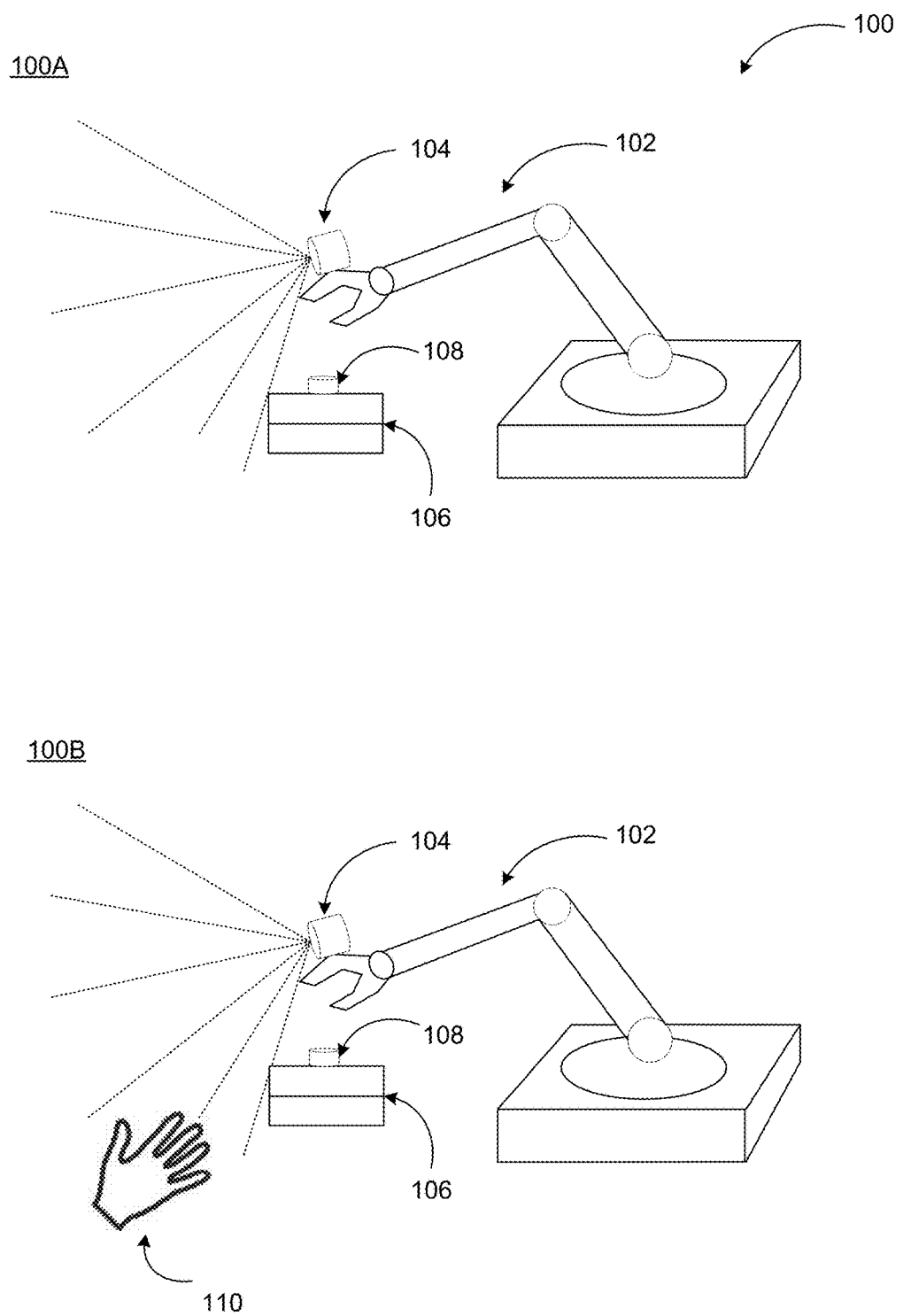
FIG. 1 illustrates an example configuration of a sensor integrated with at least a portion of robotic equipment to allow implementation of sensor-based safety features.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. The aspects of the present disclosure, as generally described herein, and illustrated in the Figures, can be arranged, substituted, combined, separated, and designed in a wide variety of different configurations, all of which are explicitly contemplated herein.

This disclosure is generally drawn, among other things, to methods, apparatus, systems, devices, and/or computer program products related to implementation of sensor-based safety features for equipment.

Briefly stated, technologies are generally described for sensor-based safety features for robotic equipment, and the implementation thereof. One or more sensors may be positioned relative to the robotic equipment such that the sensors may capture light from at least a portion of an environment surrounding the robotic equipment. In some examples, the sensors may be integrated with the robotic equipment and/or may be configured to rotate. An analysis module coupled to the sensors may build a model image of the environment based on the light captured by the sensors. The analysis module may detect that an unintended object is approaching the robotic equipment in response to detecting a change in the model image, and based on a proximity and/or a speed of approach of the object to the robotic equipment, the analysis module may instruct the robotic equipment to reduce an operating speed and/or stop motion of the robotic equipment.

FIG. 1 illustrates an example sensor integrated with at least a portion of robotic equipment to allow implementation of sensor-based safety features, arranged in accordance with at least some embodiments described herein.

As shown in a diagram 100, robotic equipment 102, such as a robotic arm, may be integrated with at least one sensor 104. The sensor 104 may be a complementary metal oxide semiconductor (CMOS) image sensor, a charged coupled device (CCD) image sensor, and an N-type metal oxide semiconductor (NMOS) image sensor, for example. The robotic equipment 102 may include an extension shaped as a wrench, for example, and may be programmed to perform a task, such as to tighten a nut 108 in order to fasten one or more components of a part 106 together. A cell in which the robotic equipment 102 is located may further include one or more machines or peripherals programmed to perform the task in conjunction with the robotic equipment 102.

In a first configuration 100A, the sensor 104 may be configured to capture light from an environment surrounding the robotic equipment 102. An analysis module coupled to the sensor 104 may be configured to build a model image of the environment based on the light captured by the sensors, where the model image includes the part 106. The analysis module may be configured to build the model image employing one or more Gaussian distributions. A time variation of the model image may be stored as a plurality of frames and a comparison of the frames may be used to detect a change in the model image. The analysis module may be further configured to classify pixels of the model image into a foreground or a background of the model image, where pixels classified as the foreground of the model image are indicative of motion. Subsequently, the pixels classified as the foreground of the model image may be grouped, and may be representative of expected motion associated with the environment surrounding the robotic equipment 102. For example, the expected motion as the part 106 approaches the robotic equipment so that the robotic equipment may tighten the nut 108 in order to fasten the components of the part 106 together, as programmed. A threshold value for a size of the group may be assigned such that unexpected motion in the environment due to an approaching object may be detected in response to the size of the group exceeding the threshold value. The unexpected motion may be due to an incorrect part of differing size and/or shape approaching the robotic equipment 102, a portion of a human body approaching the robotic equipment 102, and/or debris from other robotic equipment or machines within the cell approaching the robotic equipment 102. The model image may be stored as a histogram in a database of the analysis module. The histogram may be referenced if a change in the model image is detected.

In a second configuration 100B, an object, such a human hand 110 may be approaching the robotic equipment 102. The light captured by the sensor 104 may be analyzed by the analysis module to build the model image of the environment, and a change in the model image may be detected due to the approaching human hand 110. For example, as the analysis module classifies the pixels of the model image as a foreground or a background of the model image, and groups the pixels classified as the foreground, the analysis module may determine that the size of the group exceeds the assigned threshold value. In response to the detected change, the analysis module may send instructions to a computing device controlling the robotic equipment 102 or directly to the robotic equipment 102 to adjust an operating speed of the robotic equipment 102 based on a proximity and/or a speed of approach of the human hand 110 to the robotic equipment 102.

The operating speed may be adjusted in a stepped manner or a continuous manner as the human hand 110 approaches the robotic equipment 102, and a location of the human hand 110 within one or more defined boundaries may determine the proximity of the human hand 110 to the robotic equipment 102 on which the adjustment is based. For example, a first boundary and a second boundary may be defined by an operator of the robotic equipment 102, where the first boundary is closer in proximity to the robotic equipment 102 than the second boundary. The boundaries may be planar, linear, and/or three-dimensional. The operator may define the boundaries through a user interface provided to the operator, where the user interface is coupled to the analysis module, and may be configured to display the model image of the environment surrounding the robotic equipment 102.

In one example, the analysis module may instruct the robotic equipment 102 to reduce the operating speed of the robotic equipment 102 in response to detecting the human hand 110 at a location within the second boundary. The instruction to reduce the operating speed may be optional due to a greater distance between the human hand 110 and the robotic equipment 102. In another example, the analysis module may instruct the robotic equipment 102 to stop motion in response to detecting the human hand 110 at a location within the first boundary. The instruction to stop motion may be mandatory due to the closer proximity of the human hand 110 to the robotic equipment 102.

In response to detecting the human hand 110 has left the first boundary, the analysis module may instruct the robotic equipment 102 to restart motion, and/or in response to detecting the human hand 110 has left the second boundary, the analysis module may instruct the robotic equipment 102 to increase the operating speed of the robotic equipment 102. Similarly, the operating speed may be increased in a stepped manner or a continuous manner as the human hand 110 departs from the environment surrounding robotic equipment 102. The analysis module may detect the human hand 110 is absent from the first and/or second boundary by matching a histogram of a current model image to another histogram of a last known model image in which the human hand was absent, for example, the histogram discussed in the first configuration 100A.

Currently in manufacturing environments, a variety of safety features for robotic equipment, such as light screens, laser scanners, fencing, and/or safety mats, are implemented to provide quality control and/or protection to humans working in the manufacturing environment, as well as the robotic equipment itself. However, the cost to implement these safety features can range from several hundred dollars to several thousand dollars. Accordingly, sensor-based safety features for robotic equipment as described in the above embodiments may provide a cost effective method to implement safety features for the robotic equipment to promote a safe, productive manufacturing environment.

Figure 2A:
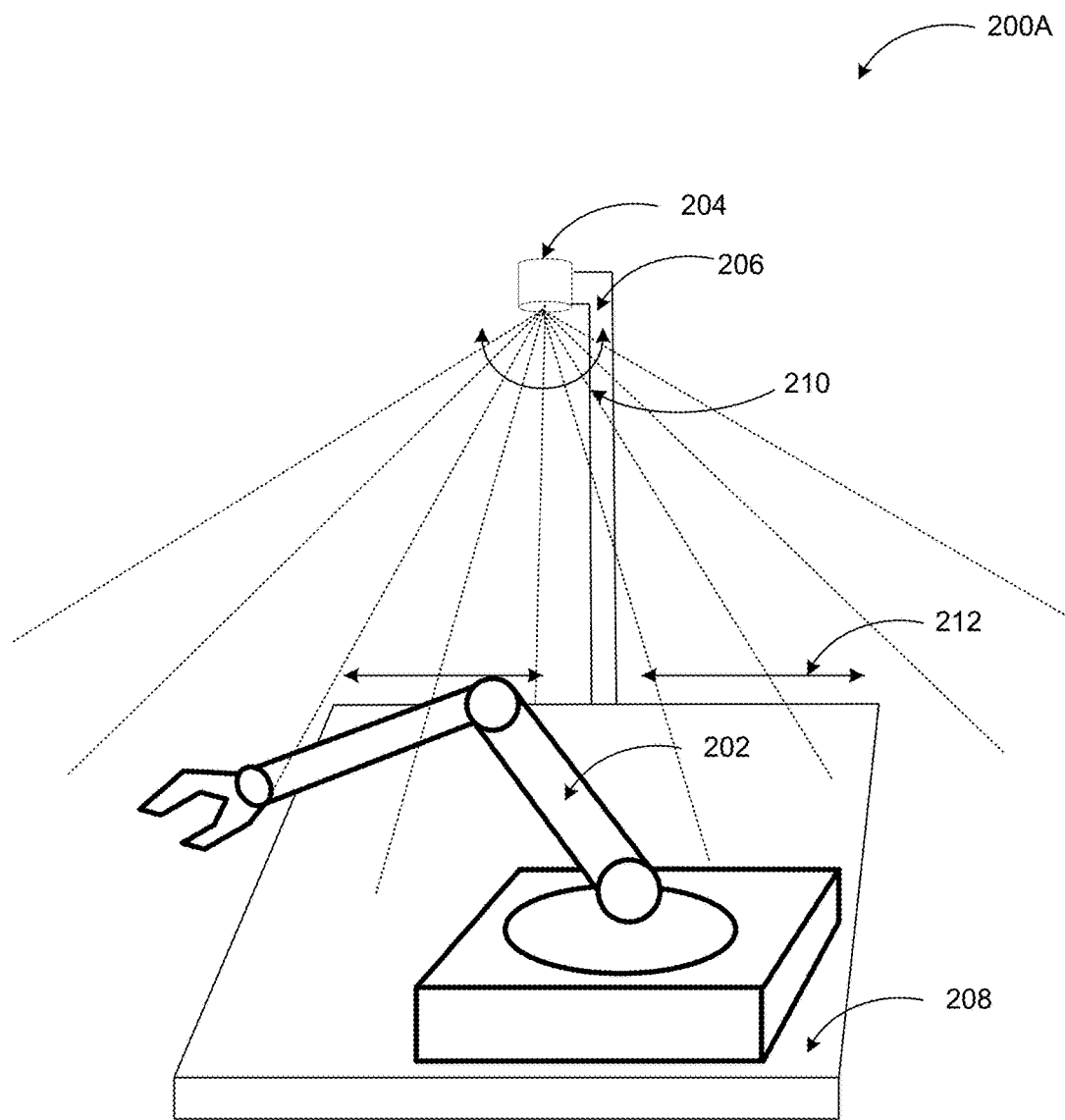
FIGS. 2A and 2B illustrate other example configurations of one or more sensors and robotic equipment to allow implementation of sensor-based safety features.
Figure 2B:
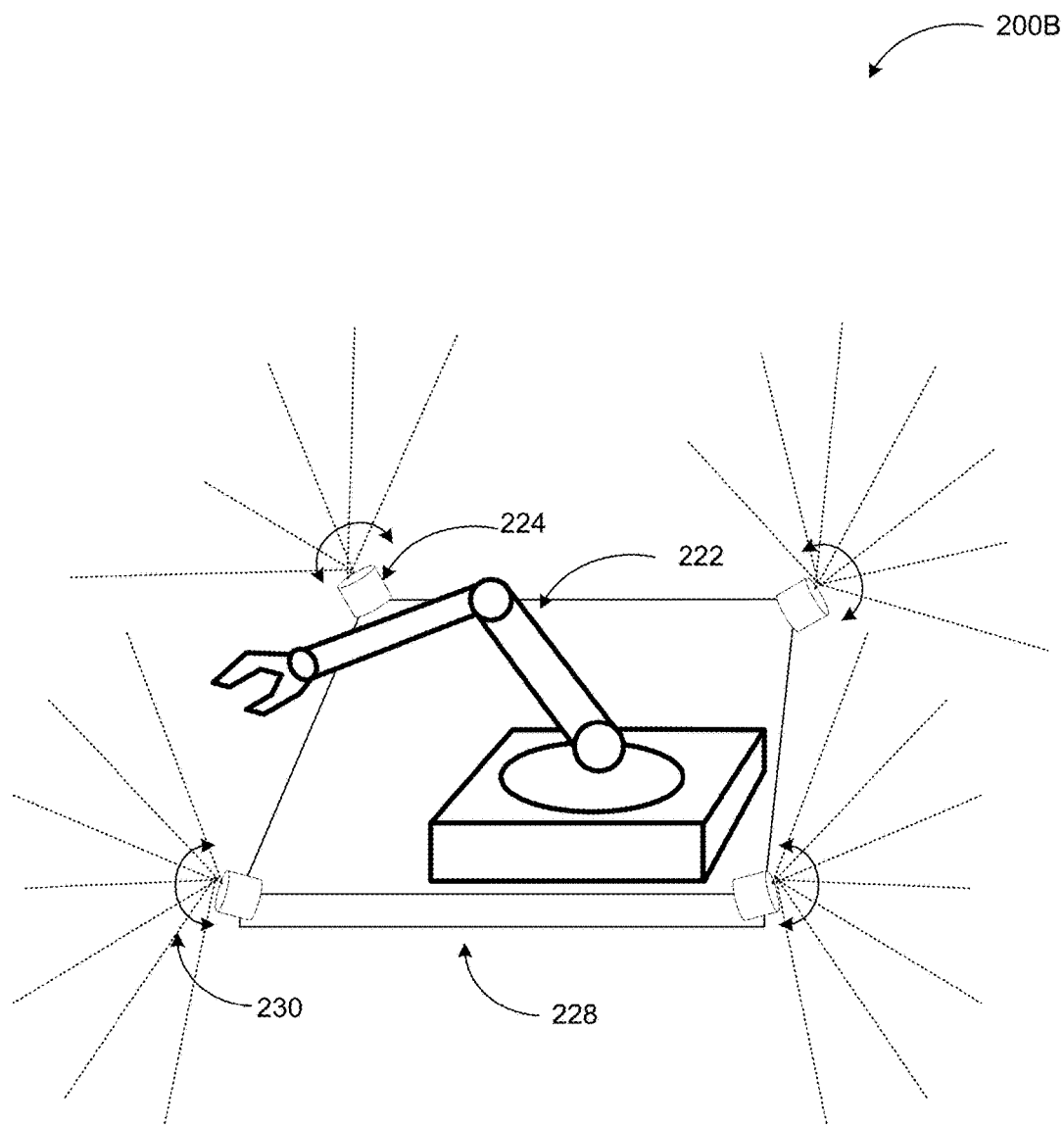

FIGS. 2A and 2B illustrate other example configurations of one or more sensors and robotic equipment to allow implementation of sensor-based safety features, arranged in accordance with at least some embodiments described herein.

As shown in a diagram 200A, a sensor 204 may be positioned above robotic equipment 202 such that the sensor 204 is configured to capture light from an environment surrounding the robotic equipment. The sensor 204 may be positioned above the robotic equipment employing a support device 206 to which the sensor 204 may be coupled to. In some examples, the support device 206 may be attached to a surface 208 supporting the robotic equipment 202, as illustrated. The surface 208 may be a table surface, a conveyor belt surface, a work bench surface, and a wall, among other examples. In other examples, the support device 206 may be attached to another surface, where the other surface is positioned above the robotic equipment 202, such as a ceiling. In further examples, the sensor may be configured to rotate 210 or the support device 206 may be portable 212 such that light may be captured from an entirety of the environment surrounding the robotic equipment 202.

As shown in a diagram 200B, multiple sensors 224 may be positioned relative to robotic equipment 222 such that the sensors 224 are configured to capture light from an entirety of the environment surrounding the robotic equipment 222. The multiple sensors 224 may be directly attached to a surface 228 supporting the robotic equipment 222. As previously discussed, the surface 228 may be a table surface, a conveyor belt surface, a work bench surface, and a wall, among other examples. One or more of the multiple sensors 224 may be configured to rotate 230.

Figure 3:
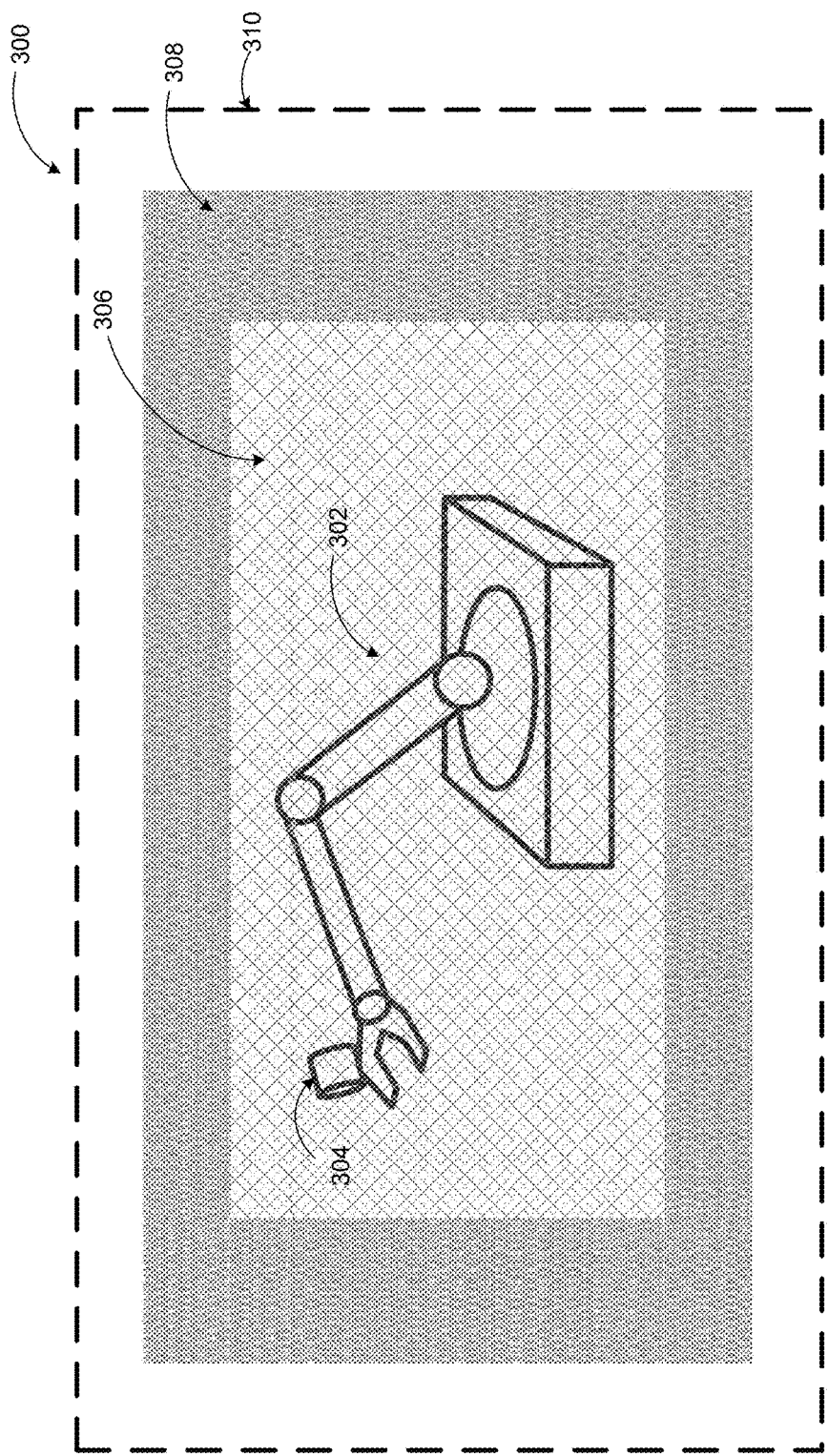
FIG. 3 illustrates example boundary definitions.

FIG. 3 illustrates example boundary definitions, arranged in accordance with at least some embodiments described herein.

As shown in a diagram 300, an operator of robotic equipment 302 integrated with a sensor 304 may define one or more boundaries, such as a first boundary 306 and a second boundary 308, within an environment surrounding the robotic equipment 302. In defining the first boundary 306 and the second boundary 308, an outlying boundary 310 may be formed comprising all other regions of the environment. The operator may define the boundaries through a user interface provided to the operator. The user interface may be coupled to an analysis module, and configured to display a model image of an environment surrounding the robotic equipment 302 built by the analysis module based on light captured by the sensor 304. Display of the model image may provide the operator a visual representation of the environment when defining the boundaries. The boundaries defined may be planar, linear, and/or three-dimensional, for example. As illustrated, a distance between the first boundary 306 and the robotic equipment 302 may be less than a distance between the second boundary 308 and the robotic equipment 302.

If an object approaching the robotic equipment 302 is detected by the analysis module, a location of the object within the first boundary 306 or second boundary 308 may determine an instruction sent to the robotic equipment 302 from the analysis module to adjust an operating speed of the robotic equipment 302. For example, in response to detecting the object at a location within the second boundary 308, the analysis module may instruct the robotic equipment 302 to reduce the operating speed of the robotic equipment 302. The operating speed may be reduced in a stepped manner, in a continuous manner, or in another manner. In some embodiments, the operating speed may be reduced to zero (that is, stop the robotic equipment). For example, in response to detecting the object at a location within the first boundary 306, the analysis module may instruct the robotic equipment 302 to stop motion. When the object is located in the second boundary 308, the instruction may be optional, but when the object is located in the first boundary 306, the instruction may be mandatory due to the closer proximity of the object to the robotic equipment 302. According to another example, in response to detecting the object at a location within the outlying boundary 310, no instruction may be sent to the robotic equipment 302.

Similarly, as the object is departing from the environment surrounding the robotic equipment 302, a location of the object within the second boundary 308 or the outlying boundary 310 may determine an instruction sent from the analysis module to the robotic equipment 302 to resume operation of the robotic equipment 302. For example, in response to detecting the object has left the first boundary 306 and is located in the second boundary 308, the analysis module may instruct the robotic equipment 302 to restart motion. In response to detecting the object has left the second boundary 308 and is located in the outlying boundary 310, the analysis module may instruct the robotic equipment 102 to increase the operating speed of the robotic equipment 302. The operating speed may be increased in a stepped, continuous, or other manner as the object departs from the environment surrounding robotic equipment 302.

Figure 4:
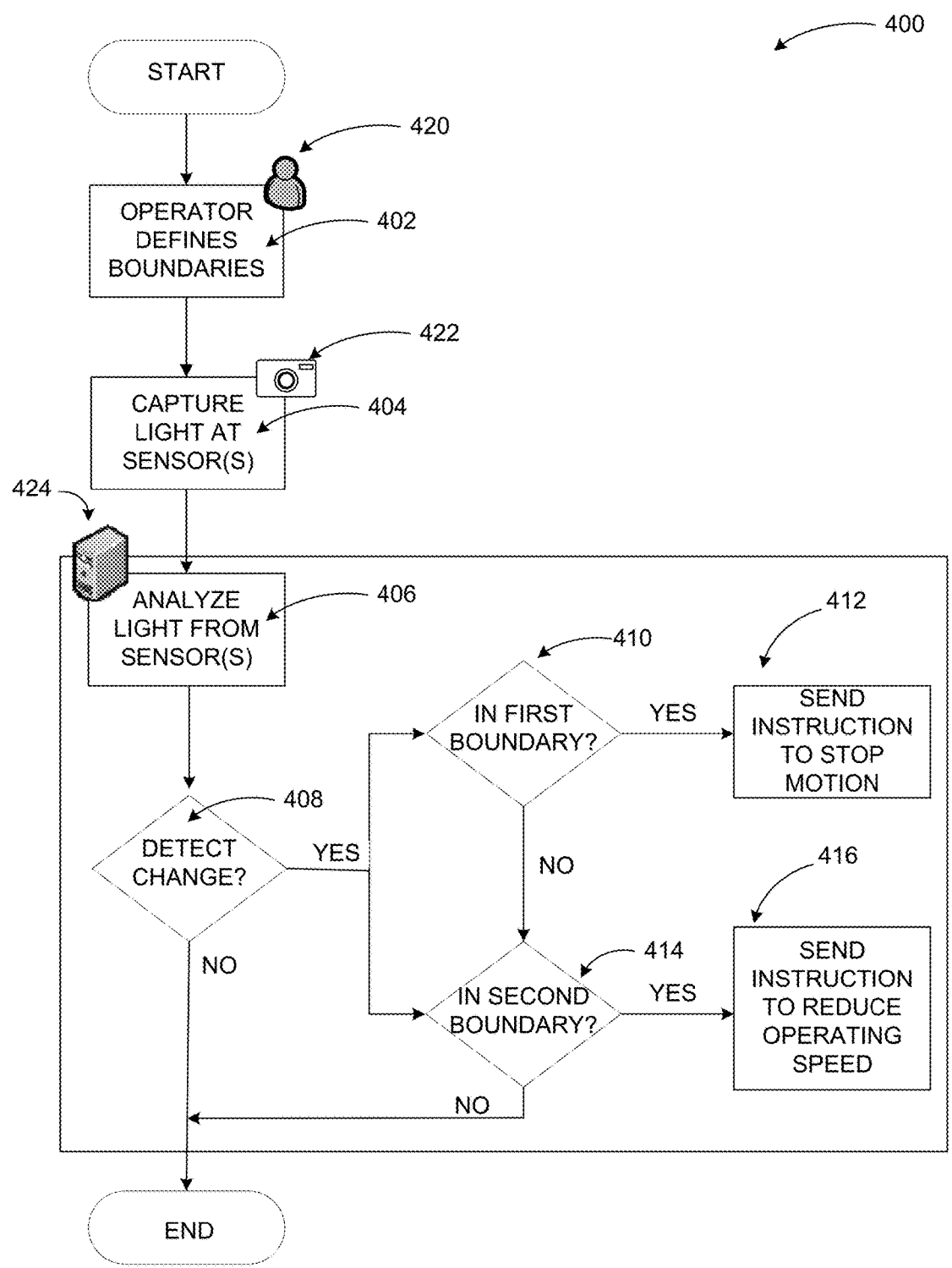
FIG. 4 illustrates an example process to implement sensor-based safety features for robotic equipment.

FIG. 4 illustrates an example process to implement sensor-based safety features for equipment, arranged in accordance with at least some embodiments described herein.

As shown in a diagram 400, at an operation 402, "OPERATOR DEFINES BOUNDARIES," an operator 420 of robotic equipment may define one or more boundaries, such as a first boundary and a second boundary, within an environment surrounding the robotic equipment through a user interface configured to display a model image of the environment. The user interface may be coupled to an analysis module 424 configured to build the model image of the environment based on light captured from the environment by one or more sensors 422 at an operation 404, "CAPTURE LIGHT AT SENSOR(S)." The one or more sensors 422 may be integrated with the robotic equipment and/or may be positioned separate from, but relative to, the robotic equipment such that the light is captured from at least a portion of the environment surrounding the robotic equipment. In some embodiments, the sensors 422 may be configured to rotate such that light from an entirety of the environment surrounding the robotic equipment is captured.

At an operation 406, "ANALYZE LIGHT FROM SENSOR(S)," the analysis module 424 may be configured to analyze the light captured from the sensors 422. For example, the analysis module 424 may classify pixels of the model image into a foreground or a background of the model image, where pixels classified as the foreground of the model image are indicative of motion. Subsequently, the pixels classified as the foreground of the model image may be grouped, and may be representative of expected motion associated with the environment surrounding the robotic equipment. A threshold value for a size of the group may be assigned such that unexpected motion in the environment due to an approaching object may be detected in response to the size of the group exceeding the threshold value. The unexpected motion may be due to an incorrect part or component of differing size and/or shape approaching the robotic equipment, a portion of a human body approaching the robotic equipment, and/or debris from other robotic equipment or machines, among other examples.

Based on a determination of the size of the group, the analysis module may be configured to detect if the model image has changed at an operation 408, "DETECT CHANGE?". If the size of the group does not exceed the threshold value, no change in the model image is detected and no further operations may be performed. If the size of the group exceeds the threshold value, a change in the model image is detected, where the change may be indicative of an unintended object approaching the robotic equipment. The analysis module may be configured to instruct the robotic equipment to adjust an operating speed based on a proximity and/or a speed of the approaching object. A location of the object within the first boundary or the second boundary defined by the operator at the operation 402 may determine the proximity of the object to the robotic equipment on which the adjustment is based.

At an operation 412, "SEND INSTRUCTION TO STOP MOTION," the analysis module may instruct the robotic equipment to stop motion in response to a determination that the object is detected at a location within the first boundary at decision operation 410, "IN FIRST BOUNDARY?" due to a closer proximity of the object to the robotic equipment. At an operation 416, "SEND INSTRUCTION TO REDUCE OPERATING SPEED," the analysis module may instruct the robotic equipment to reduce the operating speed of the robotic equipment in response to a determination that the object is detected at a location within the second boundary at decision operation 414, "IN SECOND BOUNDARY?" due to a greater distance between the object and the robotic equipment.

Figure 5:
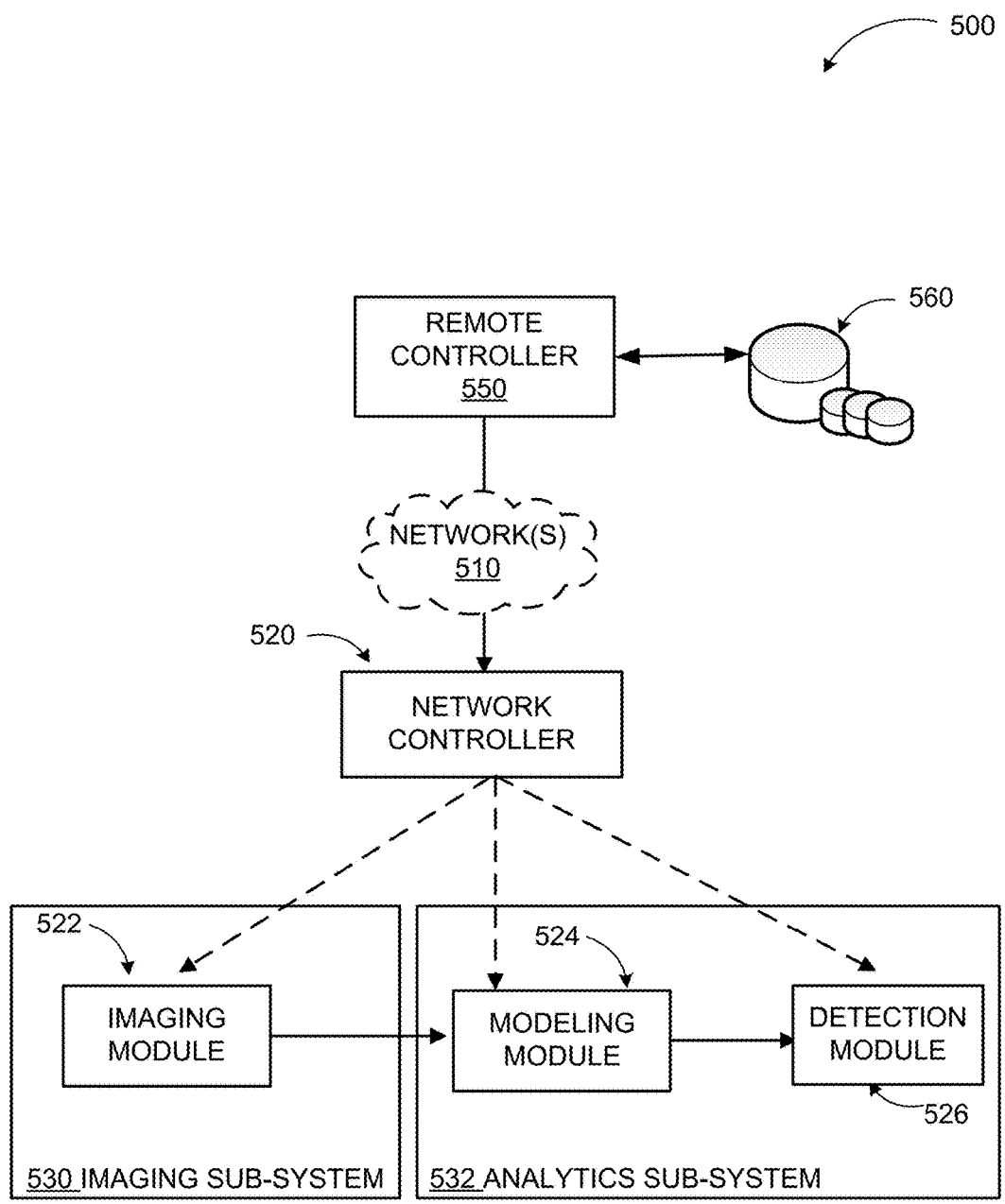
FIG. 5 illustrates an example controller of a system configured to implement sensor-based safety features for robotic equipment.

FIG. 5 illustrates an example controller of a system configured to implement sensor-based safety features for equipment, arranged in accordance with at least some embodiments described herein.

As depicted, a system 500 may include at least one controller 520, at imaging sub-system 530 comprising at least one imaging module 522, and an analytics sub-system 532 comprising at least one modeling module 524 and at least one detection module 526. The controller 520 may be operated by human control or may be configured for automatic operation, or may be directed by a remote controller 550 through at least one network (for example, via network 510). Data associated with controlling the different processes of production may be stored at and/or received from data stores 560.

The controller 520 may include and/or control the imaging module 522 of the imaging sub-system, the imaging module 522 configured to capture light from an environment surrounding robotic equipment through one or more sensors. The sensors may be integrated with the robotic equipment and/or positioned separate from, but relative, to the robotic equipment such that light from at least a portion of the environment surrounding the robotic equipment is captured. In some examples, the sensors may be configured to rotate such that light is captured from an entirety of the environment surrounding the robotic equipment.

The controller 520 may further include and/or control the modeling module 524 and the detection module 526 of the analytics sub-system 532. The modeling module 524 may be configured to build a model image of the environment surrounding the robotic equipment based on the light captured by the sensors of the imaging module 522. In some embodiments, the model image may be stored as a histogram in a database of the analytics sub-system 532 to be referenced when a change in the model image is detected, which will be discussed below. The detection module 526 may be configured to detect an object approaching the robotic equipment in response to detecting a change in the model image. For example, pixels of the model image may be classified into a foreground or a background of the model image, where pixels classified as the foreground of the model image are indicative of motion and grouped. A threshold value for a size of the group may be assigned, and in response to a determination that the size of the group has exceeded the threshold value, a change in the model image is detected that may be indicative of an object approaching the robotic equipment.

The detection module 526 may be further configured to instruct the robotic equipment to adjust an operating speed of the robotic equipment based on a proximity and/or a speed of the approaching object to the robotic equipment. A location of the object within one or more boundaries defined by an operator of the robotic equipment may determine a proximity of the object to the robotic equipment on which the adjustment is based. For example, the operator may define a first boundary and a second boundary within the environment surrounding the robotic equipment through a user interface configured to display the model image of the environment. The first boundary may be closer in proximity to the robotic equipment than the first boundary. Accordingly, in response to detecting the object in a location within the second boundary, the detection module may instruct the robotic equipment to reduce an operating speed of the robotic equipment. In some examples, the operating speed may be reduced to substantially zero. In response to detecting the in a location within the first boundary, the detection module may instruct the robotic equipment to stop motion. The motion may be resumed and/or the operating speed may increase upon detection that the object has left the first and/or second boundary, respectively, by the detection module 526. The absence of the object may be detected by matching a histogram of a current model image to a histogram of a last known model image in which the object was absent.

The examples in FIGS. 1 through 5 have been described using specific apparatuses, configurations, and systems to implement sensor-based safety features for equipment. Embodiments to implement sensor-based safety features for equipment are not limited to the specific apparatuses, configurations, and systems according to these examples.

Figure 6:
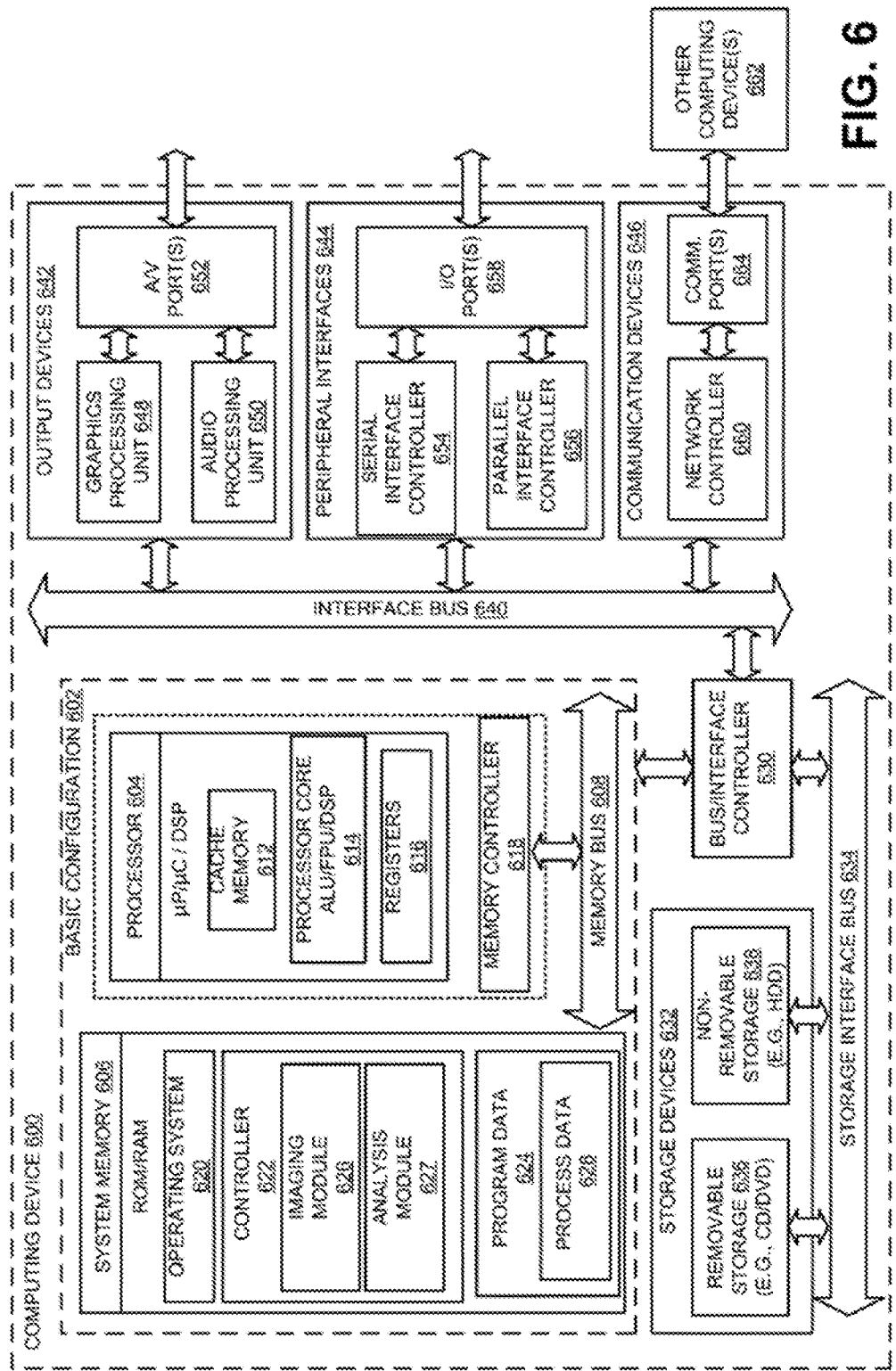
FIG. 6 illustrates a general purpose computing device, which may be used to implement sensor-based safety features for robotic equipment.

FIG. 6 illustrates a general purpose computing device, which may be used to implement sensor-based safety features for equipment, arranged in accordance with at least some embodiments described herein.

For example, the computing device 600 may be used as a server, desktop computer, portable computer, smart phone, special purpose computer, or similar devices such as a controller, a new component, a cluster of existing components in an operational system including a vehicle and a smart dwelling. In an example basic configuration 602, the computing device 600 may include one or more processors 604 and a system memory 606. A memory bus 608 may be used for communicating between the processor 604 and the system memory 606. The basic configuration 602 is illustrated in FIG. 6 by those components within the inner dashed line.

Depending on the desired configuration, the processor 604 may be of any type, including but not limited to a microprocessor (μP), a microcontroller (μC), a digital signal processor (DSP), or any combination thereof. The processor 604 may include one or more levels of caching, such as a cache memory 612, one or more processor cores 614, and registers 616. The example processor cores 614 may (each) include an arithmetic logic unit (ALU), a floating point unit (FPU), a digital signal processing core (DSP core), or any combination thereof. An example memory controller 618 may also be used with the processor 604, or in some implementations, the memory controller 618 may be an internal part of the processor 604.

Depending on the desired configuration, the system memory 606 may be of any type including but not limited to volatile memory (such as RAM), non-volatile memory (such as ROM, flash memory, etc.) or any combination thereof. The system memory 606 may include an operating system 620, a controller application 622, and program data 624. The controller application 622 may include an imaging module 626 and an analysis module 627, which may be an integral part of the application or a separate application on its own. The imaging module 626 may be configured to capture light from an environment surrounding robotic equipment. The analysis module 627 may be configured to build a model image of the environment surrounding the robotic equipment based on the light captured by the sensors of the imaging module 626, detect an object approaching the robotic equipment in response to a detection of a change in the model image, and instruct the robotic equipment to adjust an operating speed of the robotic equipment based on a proximity and/or speed of approach of the object to the robotic equipment. The program data 624 may include, among other data, process data 628 related to building the model image and detecting a change in the model image, as described herein.

The computing device 600 may have additional features or functionality, and additional interfaces to facilitate communications between the basic configuration 602 and any desired devices and interfaces. For example, a bus/interface controller 630 may be used to facilitate communications between the basic configuration 602 and one or more data storage devices 632 via a storage interface bus 634. The data storage devices 632 may be one or more removable storage devices 636, one or more non-removable storage devices 638, or a combination thereof. Examples of the removable storage and the non-removable storage devices include magnetic disk devices such as flexible disk drives and hard-disk drives (HDD), optical disk drives such as compact disc (CD) drives or digital versatile disk (DVD) drives, solid state drives (SSDs), and tape drives to name a few. Example computer storage media may include volatile and non-volatile, removable and non-removable media implemented in any method or technology for storage of information, such as computer readable instructions, data structures, program modules, or other data.

The system memory 606, the removable storage devices 636 and the non-removable storage devices 638 are examples of computer storage media. Computer storage media includes, but is not limited to, RAM, ROM, EEPROM, flash memory or other memory technology, CD-ROM, digital versatile disks (DVDs), solid state drives (SSDs), or other optical storage, magnetic cassettes, magnetic tape, magnetic disk storage or other magnetic storage devices, or any other medium which may be used to store the desired information and which may be accessed by the computing device 600. Any such computer storage media may be part of the computing device 600.

The computing device 600 may also include an interface bus 640 for facilitating communication from various interface devices (for example, one or more output devices 642, one or more peripheral interfaces 644, and one or more communication devices 646) to the basic configuration 602 via the bus/interface controller 630. Some of the example output devices 642 include a graphics processing unit 648 and an audio processing unit 650, which may be configured to communicate to various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example communication device 646 includes a network controller 660, which may be arranged to facilitate communications with one or more other computing devices 662 over a network communication link via one or more communication ports 664. The one or more other computing devices 662 may include servers, client devices, and comparable devices.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as a part of a general purpose or specialized server, mainframe, or similar computer that includes any of the above functions. The computing device 600 may also be implemented as a personal computer including both laptop computer and non-laptop computer configurations.

Example embodiments may also include methods to implement sensor-based safety features for equipment. These methods can be implemented in any number of ways, including the structures described herein. One such way may be by machine operations, of devices of the type described in the present disclosure. Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine automated.

Figure 7:
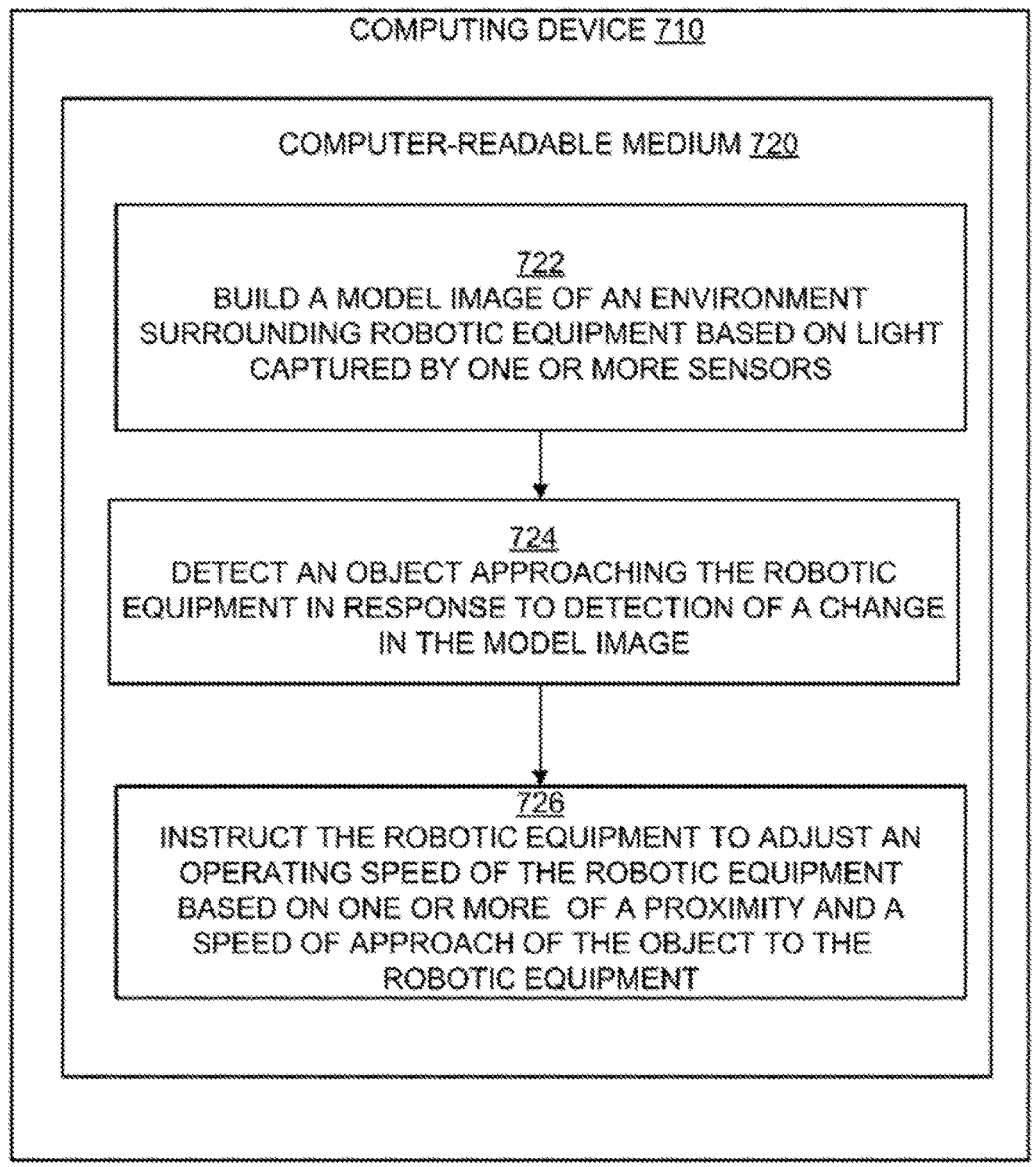
FIG. 7 is a flow diagram illustrating an example process to implement sensor-based safety features for robotic equipment that may be performed by a computing device such as the computing device in FIG. 6.

FIG. 7 is a flow diagram illustrating an example process to implement sensor-based safety features for equipment that may be performed by a computing device such as the computing device in FIG. 6, arranged in accordance with at least some embodiments described herein.

Example methods may include one or more operations, functions or actions as illustrated by one or more of blocks 722, 724, and/or 726. The operations described in the blocks 722 through 726 may also be stored as computer-executable instructions in a computer-readable medium such as a computer-readable medium 720 of a computing device 710.

An example process to implement sensor-based safety features for robotic equipment may begin with block 722, "BUILD A MODEL IMAGE OF AN ENVIRONMENT SURROUNDING ROBOTIC EQUIPMENT BASED ON LIGHT CAPTURED BY ONE OR MORE SENSORS," where one or more sensors may capture light from an environment surrounding robotic equipment. The sensors may be integrated with the robotic equipment and/or positioned separate from, but relative to, the robotic equipment such that light from at least a portion of the environment surrounding the robotic equipment is captured. Example sensors may include CMOS image sensors, CCD image sensors, and NMOS image sensors. An analysis module coupled to the one or more sensors may be configured to build a model image of the environment surrounding the robotic equipment based on the light captured by the sensors. The analysis module may employ Gaussian distributions to build the model image. The model image may be stored as a histogram in a database of the analysis module to be referenced in response to a detected change in the model image.

Block 722 may be followed by block 724, "DETECT AN OBJECT APPROACHING THE ROBOTIC EQUIPMENT IN RESPONSE TO DETECTION OF A CHANGE IN THE MODEL IMAGE," where the analysis module may classify pixels of the model image into a foreground or a background of the model image, where pixels classified as the foreground of the model image are indicative of motion and grouped. A threshold value for a size of the group may be assigned, and in response to a determination that the size of the group has exceeded the threshold value, a change in the model image is detected that may be indicative of an object approaching the robotic equipment. The object approaching the robotic equipment may be an incorrect part or component of differing size and/or shape, a portion of a human body, and/or debris from one or more other machines in the environment.

Block 724 may be followed by block 726, "INSTRUCT THE ROBOTIC EQUIPMENT TO ADJUST AN OPERATING SPEED OF THE ROBOTIC EQUIPMENT BASED ON ONE OR MORE OF A PROXIMITY AND A SPEED OF APPROACH OF THE OBJECT TO THE ROBOTIC EQUIPMENT," where the analysis module may be further configured to instruct the robotic equipment to adjust an operating speed of the robotic equipment based on a proximity and/or a speed of approach of the object to the robotic equipment. A location of the object within one or more boundaries defined by an operator of the robotic equipment may determine a proximity of the object to the robotic equipment on which the adjustment is based. For example, the operator may define a first boundary and a second boundary within the environment surrounding the robotic equipment through a user interface configured to display the model image of the environment. The first boundary may be closer in proximity to the robotic equipment than the first boundary. Accordingly, in response to detecting the object in a location within the second boundary, the analysis module may instruct the robotic equipment to reduce an operating speed of the robotic equipment. In some examples, the operating speed may be reduced to substantially zero. In response to detecting the object in a location within the first boundary, the analysis module may instruct the robotic equipment to stop motion. The motion may be resumed and/or the operating speed may increase upon detection that the object has left the first and/or second boundary, respectively, by the detection module. The absence of the object may be detected by matching a histogram of a current model image to a histogram of a last known model image in which the object was absent.

The blocks included in the above described process are for illustration purposes. Sensor-based safety features for equipment may be implemented by similar processes with fewer or additional blocks. In some embodiments, the blocks may be performed in a different order. In some other embodiments, various blocks may be eliminated. In still other embodiments, various blocks may be divided into additional blocks, or combined together into fewer blocks.

Figure 8:
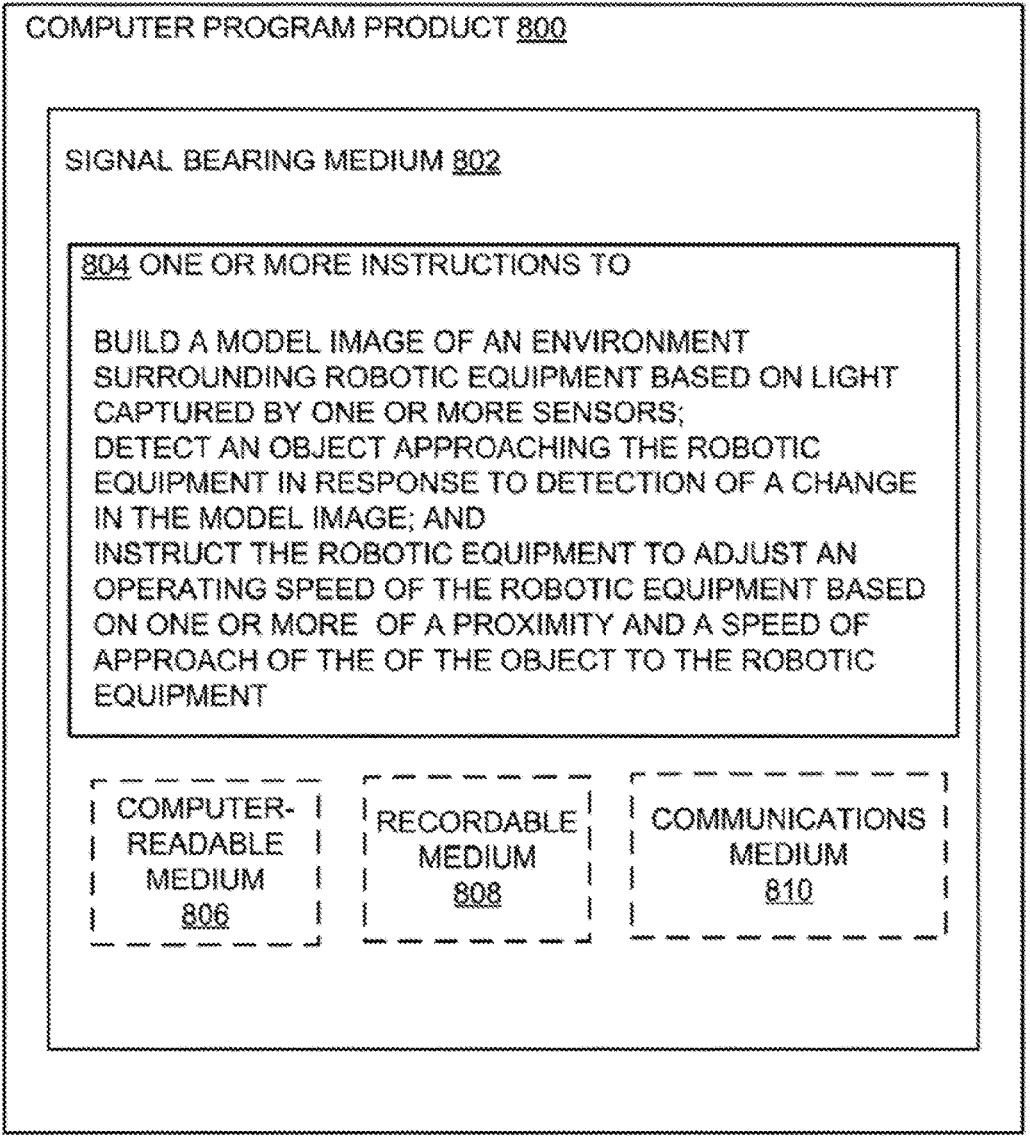
FIG. 8 illustrates a block diagram of an example computer program product, all arranged in accordance with at least some embodiments described herein.

FIG. 8 illustrates a block diagram of an example computer program product, arranged in accordance with at least some embodiments described herein.

In some embodiments, as shown in FIG. 8, the computer program product 800 may include a signal bearing medium 802 that may also include one or more machine readable instructions 804 that, when executed by, for example, a processor, may provide the functionality described herein. Thus, for example, referring to the processor 604 in FIG. 6, imaging module 626 and analysis module 627 executed on the processor 604 may undertake one or more of the tasks shown in FIG. 8 in response to the instructions 804 conveyed to the processor 604 by the signal bearing medium 802 to perform actions associated with implementation of sensor-based safety features for equipment as described herein. Some of those instructions may include, for example, one or more instructions to build a model image of an environment surrounding robotic equipment based on light captured by one or more sensors, detect an object approaching the robotic equipment in response to detection of a change in the model image, and instruct the robotic equipment to adjust an operating speed of the robotic equipment based on one or more of a proximity and a speed of approach of the object to the robotic equipment.

In some implementations, the signal bearing medium 802 depicted in FIG. 8 may encompass a computer-readable medium 806, such as, but not limited to, a hard disk drive (HDD), a solid state drive (SSD), a Compact Disc (CD), a Digital Versatile Disk (DVD), a digital tape, memory, etc. In some implementations, the signal bearing medium 802 may encompass a recordable medium 808, such as, but not limited to, memory, read/write (R/W) CDs, R/W DVDs, etc. In some implementations, the signal bearing medium 802 may encompass a communications medium 810, such as, but not limited to, a digital and/or an analog communication medium (for example, a fiber optic cable, a waveguide, a wired communication link, a wireless communication link, etc.). Thus, for example, the computer program product 800 may be conveyed to one or more modules of the processor 604 of FIG. 6 by an RF signal bearing medium, where the signal bearing medium 802 is conveyed by the wireless communications medium 810 (for example, a wireless communications medium conforming with the IEEE 802.11 standard).

According to some examples, methods to implement sensor-based safety features for robotic equipment are described. Example methods may include generating a model image of an environment surrounding the robotic equipment based on light captured by one or more sensors, where a time variation of the model image is stored as a plurality of frames; detecting a change in the model image based on a comparison of one or more frames; and determining whether an unintended object is approaching the robotic equipment based on the detected change. Example methods may also include instructing the robotic equipment to adjust an operating speed of the robotic equipment based on one or more of a proximity and a speed of approach of the object to the robotic equipment in response to a determination that the unintended object is approaching the robotic equipment.

According to other examples, the methods may further include determining the one or more of the proximity and the speed of approach of the object to the robotic equipment based on the comparison of the one or more frames, or classifying pixels of the model image into one of a foreground and a background of the model image. The methods may also include grouping the pixels classified as the foreground of the model image, where the grouped pixels classified as the foreground of the model image are indicative of motion. The methods may further include assigning a threshold value for a size of the grouped pixels. Detecting the change in the model image may include determining that the size of the grouped pixels exceeds the threshold value.

According to further examples, instructing the robotic equipment to adjust the operating speed of the robotic equipment may include instructing the robotic equipment to reduce the operating speed of the robotic equipment to substantially zero or instructing the robotic equipment to bring the robotic equipment to a stop. The methods may further include receiving, from an operator of the robotic equipment through a user interface displaying the model image, a definition of at least a first boundary and a second boundary within the environment surrounding the robotic equipment. A distance between the first boundary and the robotic equipment may be less than a distance between the second boundary and the robotic equipment. Instructing the robotic equipment may include instructing the robotic equipment to stop motion in response to detecting the object at a location between the first boundary and the robotic equipment or instructing the robotic equipment to reduce the operating speed of the robotic equipment in response to detecting the object at a location between the second boundary and the first boundary.

According to yet other examples, instructing the robotic equipment may include instructing the robotic equipment to restart motion in response to detecting the object leave the first boundary or instructing the robotic equipment to increase the operating speed of the robotic equipment in response to detecting the object leave the second boundary. Detecting the object leave the second boundary may include storing the plurality of frames as histograms and determining an absence of the object in response to determining that a histogram of a current frame matches a histogram of a last known frame in which the object was absent within the second boundary.

According to other examples, an apparatus configured to implement sensor-based safety features for robotic equipment is described. An example apparatus may include one or more sensors configured to capture light from an environment surrounding the robotic equipment and at least one analysis module communicatively coupled to the one or more sensors. The at least one analysis module may be configured to generate a model image of an environment surrounding the robotic equipment based on the light captured by the one or more sensors, where a time variation of the model image is stored as a plurality of frames; detect a change in the model image based on a comparison of one or more frames; and determine whether an unintended object is approaching the robotic equipment based on the detected change. The at least one analysis module may also be configured to instruct the robotic equipment to adjust an operating speed of the robotic equipment based on one or more of a proximity and a speed of approach of the object to the robotic equipment in response to a determination that the unintended object is approaching the robotic equipment.

According to further examples, the one or more sensors may include complementary metal oxide semiconductor (CMOS) image sensors, charged coupled device (CCD) image sensors, or N-type metal oxide semiconductor (NMOS) image sensors. The one or more sensors may be positioned at one or more locations relative to the robotic equipment such that the light is captured from at least one portion of the environment surrounding the robotic equipment. The one or more sensors may be integrated with the robotic equipment.

According to yet other examples, the one or more sensors may be positioned or configured to rotate such that the light is captured from substantially an entirety of the environment surrounding the robotic equipment. The at least one analysis module may be configured to generate the model image employing one or more Gaussian distributions. The apparatus may also include a user interface coupled to the at least one analysis module, the user interface configured to display the model image of the environment surrounding the robotic equipment to an operator of the robotic equipment. The at least one analysis module may be further configured to receive, from the operator of the robotic equipment, a definition of at least a first boundary and a second boundary within the environment surrounding the robotic equipment. The at least one analysis module may also be configured to determine the proximity of the object to the robotic equipment based on a location of the object within the first boundary or the second boundary.

According to further examples, a system to implement sensor-based safety features for robotic equipment is described. The system may include at least one imaging module configured to capture light of an environment surrounding the robotic equipment through one or more sensors; at least one modeling module configured to generate a model image of an environment surrounding the robotic equipment based on the light captured by the at least one imaging module, where a time variation of the model image is stored as a plurality of frames; and at least one detection module configured to detect a change in the model image based on a comparison of one or more frames and determine whether an unintended object is approaching the robotic equipment based on the detected change. The system may also include at least one controller configured to instruct the robotic equipment to adjust an operating speed of the robotic equipment based on one or more of a proximity and a speed of approach of the object to the robotic equipment in response to a determination that the unintended object is approaching the robotic equipment.

According to yet further examples, the at least one controller may be further configured to control operational aspects of the at least one imaging module, the at least one modeling module, and the at least one detection module. The at least one modeling module may be further configured to classify pixels of the model image into one of a foreground and a background of the model image; group the pixels classified as the foreground of the model image; and assign a threshold value for a size of the grouped pixels. The at least one detection module may be further configured to determine that the size of the grouped pixels exceeds the threshold value in order to detect the change in the model image.

EXAMPLES

Following are illustrative examples of how some embodiments may be implemented, and are not intended to limit the scope of embodiments in any way.

Example 1: Detection of a Human Hand within a First Boundary by a Sensor Positioned Above a Robotic Quilting Machine in a Textile Manufacturing Plant A single NMOS sensor coupled to a support device is positioned above a robotic quilting machine configured to fabricate a material composed of three layers of fiber. The support device is attached to a component of the robotic quilting machine. The single sensor is configured to capture light from an environment of the robotic quilting machine, and is further configured to rotate to ensure light is captured from an entirety of the environment. An analysis module coupled to the sensor is configured to build a model image based on the captured light from the environment. The model image includes the layers of fiber used to fabricate the material and one or more other machines and/or peripherals configured to perform the fabrication in conjunction with the robotic quilting machine. The model image is saved as a histogram within a database of the analysis module to be referenced in response to a detection of a change in the model image. A user interface coupled to the analysis module provides a display of the model image to an operator of the robotic quilting machine and allows the operator to define a first boundary and a second boundary within the environment. The first boundary is an area of the environment within 10 centimeters (cm) of the robotic quilting machine and the second boundary is an area of the environment from 10 cm to 40 cm of the robotic quilting machine.

The analysis module classifies pixels within the model image into a foreground and/or a background of the model image. The pixels classified as the foreground of the model image is grouped together and are indicative of motion associated with the environment of the robotic quilting device. For example, the motion of feeding the layers of fiber used to fabricate the material into the robotic quilting machine and the motion of the one or more other machines and/or peripherals configured to perform the fabrication in conjunction with the robotic quilting machine. A size of the group is assigned a threshold value. The analysis module detects a change in the model image in response to a determination that the size of the group exceeds the threshold value due to unexpected motion in the environment, where the change is indicative of a human hand approaching the robotic quilting machine. The human hand is determined to be located 3 cm above the robotic quilting machine within the first boundary.

The analysis module is configured to instruct the robotic quilting machine to stop motion based on the location of the human hand in the first boundary. Once the analysis module detects the human hand moves to a location 11 cm above the robotic quilting machine within the second boundary, the analysis module instructs the robotic quilting machine to restart the motion of the robotic quilting machine. Furthermore, once the analysis module detects the human hand moves to a location 41 cm above the robotic quilting machine outside of the second boundary, the analysis module is configured to increase an operating speed of the robotic quilting machine. The analysis module detects the absence of the human hand from the first and/or second boundaries by matching a histogram of a current model image with a histogram of a last known model image in which the human hand was absent.

Example 2: Detection of Incorrect Component within a Second Boundary by a Sensor Integrated with Robotic Welder in a Car Manufacturing Plant A single CMOS image sensor is integrated with a robotic welder configured to weld together two or more floor pan components of a vehicle. The single sensor is configured to capture light from an environment of the robotic welder, and is further be configured to rotate such that light is captured from an entirety of the environment. An analysis module coupled to the sensor is configured to build a model image based on the captured light from the environment. The model image includes the floor pan components to be welded together and one or more other machines and/or peripherals configured to perform the welding in conjunction with the robotic welder. The model image is saved as a histogram within a database of the analysis module to be referenced in response to a detection of a change in the model image. A user interface coupled to the analysis module provides a display of the model image to an operator of the robotic welder and allows the operator to define a first boundary and a second boundary within the environment. The first boundary is an area of the environment within 1 meter (m) of the robotic welder and the second boundary is an area of the environment from 1 m to 2 m of the robotic welder.

The analysis module classifies pixels within the model image into a foreground and/or a background of the model image. The pixels classified as the foreground of the model image are grouped together and are indicative of motion associated with the environment of the robotic welder. For example, the motion of the approaching floor pan components to be welded together and one or more other machines and/or peripherals configured to perform the welding in conjunction with the robotic welder. A size of the group is assigned a threshold value. The analysis module detects a change in the model image in response to a determination that the size of the group exceeds the threshold value due to unexpected motion in the environment, where the change is indicative of an incorrect component, such as a suspension, approaching the robotic welder. The suspension is determined to be located 1.5 m away from the robotic welder within the second boundary.

The analysis module is configured to instruct the robotic welder to reduce an operating speed of welding based on the location of the suspension in the second boundary. Once the analysis module detects the suspension move to a location greater than 2 m away from the robotic welder outside the second boundary, the analysis module instructs the robotic welder to increase the operating speed of welding. The analysis module detects the absence of the suspension from the second boundary by matching a histogram of a current model image with a histogram of a last known model image in which the suspension was absent.

Example 3: Detection of Debris within a First and Second Boundary by Multiple Sensors Positioned Around a Robotic Etcher in an Electronics Manufacturing Plant Multiples CCD image sensors are positioned around a robotic etcher configured to etch one or more optical components onto a surface of an integrated circuit (IC). The sensors are positioned on a same surface supporting the robotic etcher. The sensors are configured to capture light from an environment of the robotic etcher, and are further configured to rotate to ensure light is captured from an entirety of the environment. An analysis module coupled to the sensor is configured to build a model image based on the captured light from the environment. The model image includes the IC, the one or more optical components, and one or more other machines and/or peripherals configured to perform the etching in conjunction with the robotic etcher. The model image is saved as a histogram within a database of the analysis module to be referenced in response to a detection of a change in the model image. A user interface coupled to the analysis module provides a display of the model image to an operator of the robotic etcher and allows the operator to define a first boundary and a second boundary within the environment. The first boundary is an area of the environment within 10 millimeters (mm) of the robotic quilting machine and the second boundary is an area of the environment from 10 mm to 40 mm of the robotic etcher.

The analysis module classifies pixels within the model image into a foreground and/or a background of the model image. The pixels classified as the foreground of the model image are grouped together and are indicative of motion associated with the environment of the robotic etcher. For example, the motion of the IC approaching the robotic etcher to allow the etching of the one or more optical components onto the IC and the motion of the one or more other machines and/or peripherals configured to perform the etching in conjunction with the robotic etcher. A size of the group is assigned a threshold value. The analysis module detects a change in the model image in response to a determination that the size of the group exceeds the threshold value due to unexpected motion in the environment, where the change is indicative of debris approaching the robotic etcher, where the debris is excess material from a previous manufacturing process to fabricate the IC.

The debris is determined to be located 35 mm from the robotic etcher within the second boundary. The analysis module is configured to instruct the robotic etcher to reduce an operating speed in a continuous manner based on the location of the debris in the second boundary. The debris continues to approach the robotic etcher and is determined to be located 5 mm from the robotic etcher within the first boundary. The analysis module is configured to instruct the robotic etcher to stop motion based on the location of the debris in the first boundary.

Once the analysis module detects the debris move to a location 10 mm away from the robotic etcher within the second boundary, the analysis module instructs the robotic etcher to restart the motion of the robotic etcher. Furthermore, once the analysis module detects the debris move to a location 40 mm away from the robotic etcher outside of the second boundary, the analysis module is configured to increase an operating speed of the robotic etcher. The analysis module detects the absence of the debris from the first and/or second boundaries by matching a histogram of a current model image with a histogram of a last known model image in which the debris was absent.

There are various vehicles by which processes and/or systems and/or other technologies described herein may be effected (for example, hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

While various compositions, methods, systems, and devices are described in terms of "comprising" various components or steps (interpreted as meaning "including, but not limited to"), the compositions, methods, systems, and devices can also "consist essentially of" or "consist of the various components and steps, and such terminology should be interpreted as defining essentially closed-member groups."

The foregoing detailed description has set forth various embodiments of the devices and/or processes via the use of block diagrams, flowcharts, and/or examples. Insofar as such block diagrams, flowcharts, and/or examples contain one or more functions and/or operations, each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, some aspects of the embodiments disclosed herein, in whole or in part, may be equivalently implemented in integrated circuits, as one or more computer programs running on one or more computers (for example, as one or more programs running on one or more computer systems), as one or more programs running on one or more processors (for example as one or more programs running on one or more microprocessors), as firmware, or as virtually any combination thereof, and that designing the circuitry and/or writing the code for the software and/or firmware would be possible in light of this disclosure.

The present disclosure is not to be limited in terms of the particular embodiments described in this application, which are intended as illustrations of various aspects. Many modifications and variations can be made without departing from its spirit and scope Functionally equivalent methods and apparatuses within the scope of the disclosure, in addition to those enumerated herein, will be possible from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, systems, or components, which can, of course, vary. It is also to be understood that the terminology used herein is for the purpose of describing particular embodiments only, and is not intended to be limiting.

In addition, the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive (HDD), a Compact Disc (CD), a Digital Versatile Disk (DVD), a digital tape, a computer memory, etc.; and a transmission type medium such as a digital and/or an analog communication medium (for example, a fiber optic cable, a waveguide, a wired communication link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that particular functionality is achieved. Hence, any two components herein combined to achieve a particular functionality may be seen as "associated with" each other such that the particular functionality is achieved, irrespective of architectures or intermediate components. Likewise, any two components so associated may also be viewed as being "operably connected", or "operably coupled", to each other to achieve the particular functionality, and any two components capable of being so associated may also be viewed as being "operably couplable", to each other to achieve the particular functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations).

Furthermore, in those instances where a convention analogous to "at least one of A, B, and C, etc." is used, in general, such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments are possible. The various aspects and embodiments disclosed herein are for purposes of illustration and are not intended to be limiting, with the true scope and spirit being indicated by the following claims.

What is claimed is:

1. A method to implement sensor-based safety features for robotic equipment, the method comprising:
    generating a model image of an environment that surrounds the robotic equipment based on light captured by one or more sensors, wherein a time variation of the model image is stored as a plurality of frames;
    receiving, through a user interface that displays the model image, a definition of at least a first boundary and a second boundary within the environment that surrounds the robotic equipment,
    wherein a distance between the first boundary and the robotic equipment is less than a distance between the second boundary and the robotic equipment;
    detecting a change in the model image based on a comparison of one or more of the plurality of frames;
    determining whether an unintended object is approaching the robotic equipment based on the detected change;
    in response to a determination that the unintended object is approaching the robotic equipment, instructing the robotic equipment to adjust an operating speed of the robotic equipment based on one or more of a proximity and a speed of approach of the unintended object to the robotic equipment; and
    in response to detection that the unintended object is leaving the second boundary within the environment that surrounds the robotic equipment, instructing the robotic equipment to increase the operating speed of the robotic equipment,
    wherein the detection that the unintended object is leaving the second boundary comprises storing the plurality of frames as histograms and determining an absence of the unintended object in response to a determination that a histogram of a current frame matches a histogram of a last known frame in which the unintended object was absent within the second boundary.

2. The method of claim 1, further comprising:
    determining the one or more of the proximity and the speed of approach of the unintended object to the robotic equipment based on the comparison of the one or more of the plurality of frames.

3. The method of claim 1, wherein instructing the robotic equipment to adjust the operating speed of the robotic equipment comprises:
    instructing the robotic equipment to reduce the operating speed of the robotic equipment to substantially zero.

4. The method of claim 1, wherein instructing the robotic equipment to adjust the operating speed of the robotic equipment comprises:
    instructing the robotic equipment to stop motion in response to detection that the unintended object is at a location between the first boundary and the robotic equipment.

5. The method of claim 1, wherein instructing the robotic equipment to adjust the operating speed of the robotic equipment comprises:
    instructing the robotic equipment to reduce the operating speed of the robotic equipment in response to detection that the unintended object is at a location between the second boundary and the first boundary.

6. The method of claim 1, further comprising instructing the robotic equipment to restart motion in response to detection that the unintended object is leaving the first boundary.

7. An apparatus configured to implement sensor-based safety features for robotic equipment, the apparatus comprising:
    one or more sensors configured to capture light from an environment that surrounds the robotic equipment; and
    at least one analysis module communicatively coupled to the one or more sensors, wherein the at least one analysis module is configured to:
        generate a model image of the environment that surrounds the robotic equipment based on the light captured by the one or more sensors, wherein a time variation of the model image is stored as a plurality of frames;
        receive, through a user interface that displays the model image, a definition of at least a first boundary and a second boundary within the environment that surrounds the robotic equipment,
        wherein a distance between the first boundary and the robotic equipment is less than a distance between the second boundary and the robotic equipment;
        detect a change in the model image based on a comparison of one or more of the plurality of frames;
        determine whether an unintended object is approaching the robotic equipment based on the detected change;
        in response to a determination that the unintended object is approaching the robotic equipment, instruct the robotic equipment to adjust an operating speed of the robotic equipment based on one or more of a proximity and a speed of approach of the unintended object to the robotic equipment; and
        in response to detection that the unintended object is leaving the second boundary within the environment that surrounds the robotic equipment, instruct the robotic equipment to increase the operating speed of the robotic equipment,
        wherein to detect that the unintended object is leaving the second boundary, the at least one analysis module is configured to store the plurality of frames as histograms and to determine an absence of the unintended object in response to a determination that a histogram of a current frame matches a histogram of a last known frame in which the unintended object was absent within the second boundary.

8. The apparatus of claim 7, wherein the one or more sensors comprise at least one of complementary metal oxide semiconductor (CMOS) image sensors, charged coupled device (CCD) image sensors, and N-type metal oxide semiconductor (NMOS) image sensors.

9. The apparatus of claim 7, wherein the one or more sensors are positioned at one or more locations relative to the robotic equipment such that the light is captured from at least one portion of the environment that surrounds the robotic equipment.

10. The apparatus of claim 7, wherein the one or more sensors are integrated with the robotic equipment.

11. The apparatus of claim 7, wherein the one or more sensors are positioned or configured to rotate such that the light is captured from substantially an entirety of the environment that surrounds the robotic equipment.

12. The apparatus of claim 7, wherein the at least one analysis module is configured to employ one or more Gaussian distributions to generate the model image.

13. The apparatus of claim 7,
wherein the user interface is coupled to the at least one analysis module and the user interface is configured to display the model image of the environment that surrounds the robotic equipment to an operator of the robotic equipment.

14. A system to implement sensor-based safety features for robotic equipment, the system comprising:
at least one imaging module configured to capture light of an environment that surrounds the robotic equipment through one or more sensors;
at least one modeling module configured to generate a model image of the environment that surrounds the robotic equipment based on the light captured by the at least one imaging module, wherein a time variation of the model image is stored as a plurality of frames;
at least one detection module configured to detect a change in the model image based on a comparison of one or more of the plurality of frames, and to determine whether an unintended object is approaching the robotic equipment based on the detected change; and
at least one controller configured to:
receive, through a user interface that displays the model image, a definition of at least a first boundary and a second boundary within the environment that surrounds the robotic equipment,
wherein a distance between the first boundary and the robotic equipment is less than a distance between the second boundary and the robotic equipment;
instruct the robotic equipment to adjust an operating speed of the robotic equipment based on one or more of a proximity and a speed of approach of the unintended object to the robotic equipment, in response to a determination that the unintended object is approaching the robotic equipment; and
instruct the robotic equipment to increase the operating speed of the robotic equipment in response to detection that the unintended object is leaving the second boundary within the environment that surrounds the robotic equipment,
wherein to detect that the unintended object is leaving the second boundary, the at least one detection module is configured to store the plurality of frames as histograms and to determine an absence of the unintended object in response to a determination that a histogram of a current frame matches a histogram of a last known frame in which the unintended object was absent within the second boundary.

15. The system of claim 14, wherein the at least one modeling module is further configured to:
classify pixels of the model image into one of a foreground and a background of the model image;
group the pixels classified as the foreground of the model image; and
assign a threshold value for a size of the grouped pixels.

16. The system of claim 15, wherein to detect the change in the model image, the at least one detection module is configured to:
determine that the size of the grouped pixels exceeds the threshold value.

* * * * *

UNITED STATES PATENT AND TRADEMARK OFFICE
CERTIFICATE OF CORRECTION

PATENT NO. : 9,740,193 B2
APPLICATION NO. : 14/432732
DATED : August 22, 2017
INVENTOR(S) : Hunt It is certified that error appears in the above-identified patent and that said Letters Patent is hereby corrected as shown below:

In the Specification

In Column 10, Line 9, delete "(HDD), optical" and insert -- (HDDs), optical --, therefor.

In Column 18, Line 40, delete "or "consist of the" and insert -- or "consist of" the --, therefor.

In the Claims

In Column 22, Line 9, in Claim 5, delete "to detection" and insert -- to a detection --, therefor.

Signed and Sealed this
Eighth Day of May, 2018

Andrei Iancu
*Director of the United States Patent and Trademark Office*